United States Patent [19]
Gentry

[11] Patent Number: 5,329,697
[45] Date of Patent: Jul. 19, 1994

[54] METHOD AND APPARATUS FOR TURNING A CONCAVE CUT IN A WORKPIECE

[75] Inventor: John T. Gentry, Springfield, Mo.

[73] Assignee: Positronic Industries, Inc., Springfield, Mo.

[21] Appl. No.: 94,761

[22] Filed: Jul. 20, 1993

Related U.S. Application Data

[62] Division of Ser. No. 961,484, Oct. 15, 1992, Pat. No. 5,255,580.

[51] Int. Cl.$^5$ .................. B23B 1/00; H01R 13/05; H01R 43/00
[52] U.S. Cl. .................... 29/874; 439/751; 439/873
[58] Field of Search .............. 82/1.11, 18, 131; 439/751, 873; 29/874

[56] References Cited

U.S. PATENT DOCUMENTS

| | | |
|---|---|---|
| 469,813 | 3/1892 | Dahlgren et al. |
| 1,485,687 | 3/1924 | Melling ...................... 82/18 |
| 1,671,540 | 5/1928 | Monteil ..................... 29/874 |
| 1,698,538 | 1/1929 | Deutsch ...................... 82/18 |
| 2,681,596 | 6/1954 | Klomp ........................ 90/20 |
| 3,545,080 | 12/1970 | Evans ....................... 29/874 |
| 3,715,956 | 2/1973 | Lieser ........................ 90/20 |
| 3,827,318 | 8/1974 | Sorenson .................... 82/1 C |
| 4,124,927 | 11/1978 | Sorenson .................... 29/37 A |
| 4,164,891 | 8/1979 | Lieser ....................... 409/165 |
| 4,204,442 | 5/1980 | Nomura ....................... 82/18 |
| 4,505,627 | 3/1985 | Wheeler ..................... 409/190 |
| 4,596,437 | 6/1986 | Rush ....................... 439/751 X |
| 4,648,295 | 3/1987 | Ley et al. .................... 82/18 |
| 4,793,817 | 12/1988 | Hiesbock ................. 439/751 X |
| 4,828,514 | 5/1989 | Johnson et al. ............. 439/751 |
| 4,863,321 | 9/1989 | Lieser ....................... 409/165 |
| 5,052,089 | 10/1991 | Gadaud et al. .............. 29/27 R |
| 5,230,642 | 7/1993 | Schempp ................... 439/751 |

FOREIGN PATENT DOCUMENTS 738771  6/1980  U.S.S.R. .................... 82/18

OTHER PUBLICATIONS

Piranha 46 by A. Seuret (date unknown).

Primary Examiner—Z. R. Bilinsky
Attorney, Agent, or Firm—Senniger, Powers, Leavitt & Roedel

[57] ABSTRACT

A method for turning a concave cut in a workpiece on a screw machine includes the steps of supporting the workpiece for rotation generally about its longitudinal axis and rotating the workpiece generally about an axis corresponding to its longitudinal axis in a first direction. A rotary cutter is turned about an axis parallel to the axis of rotation of the workpiece in a second direction opposite to the first. A tooth on the cutter engages the workpiece for forming a generally concave cut in the workpiece. Apparatus for turning a concave cut in workpiece on a lathe is also disclosed.

7 Claims, 4 Drawing Sheets

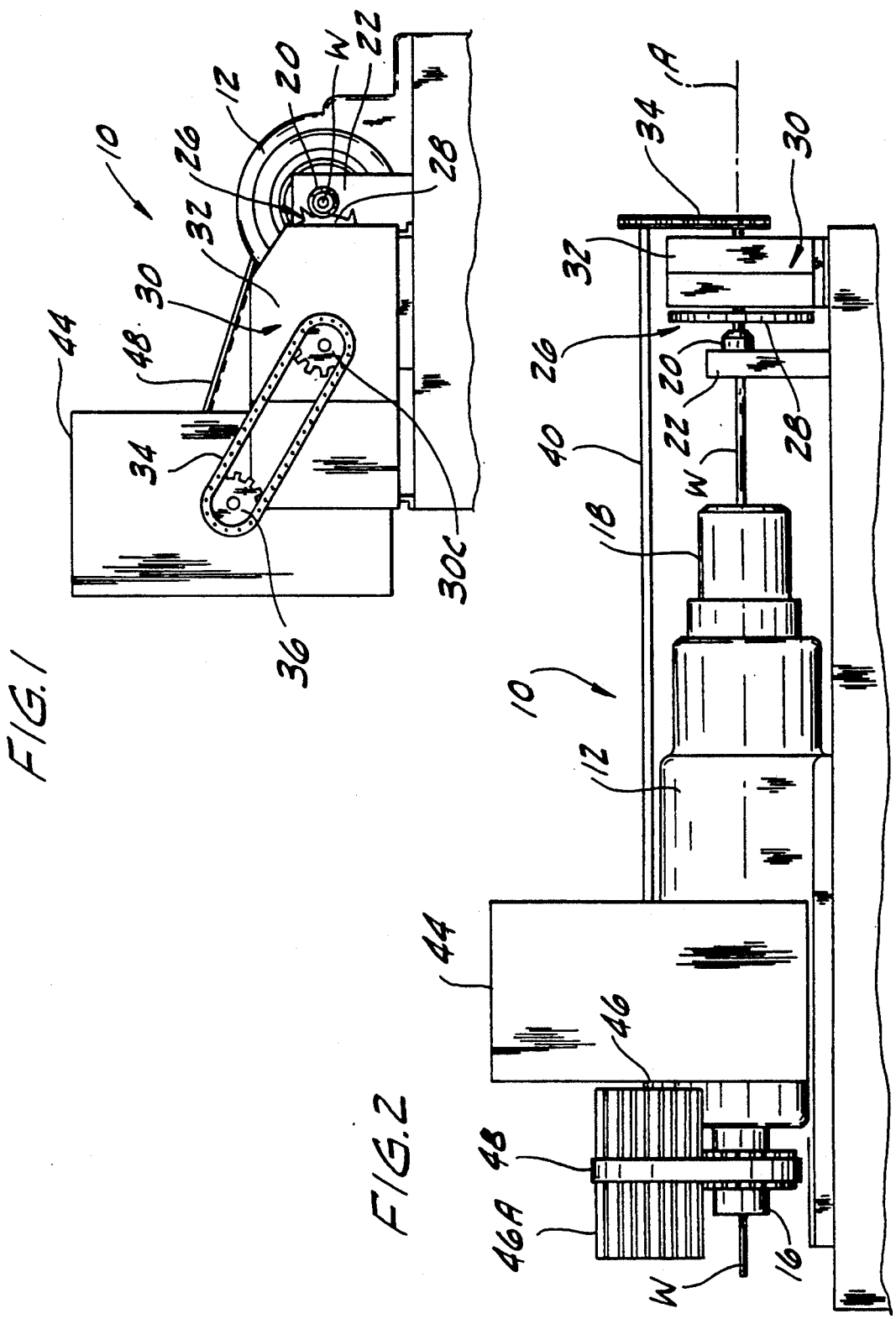

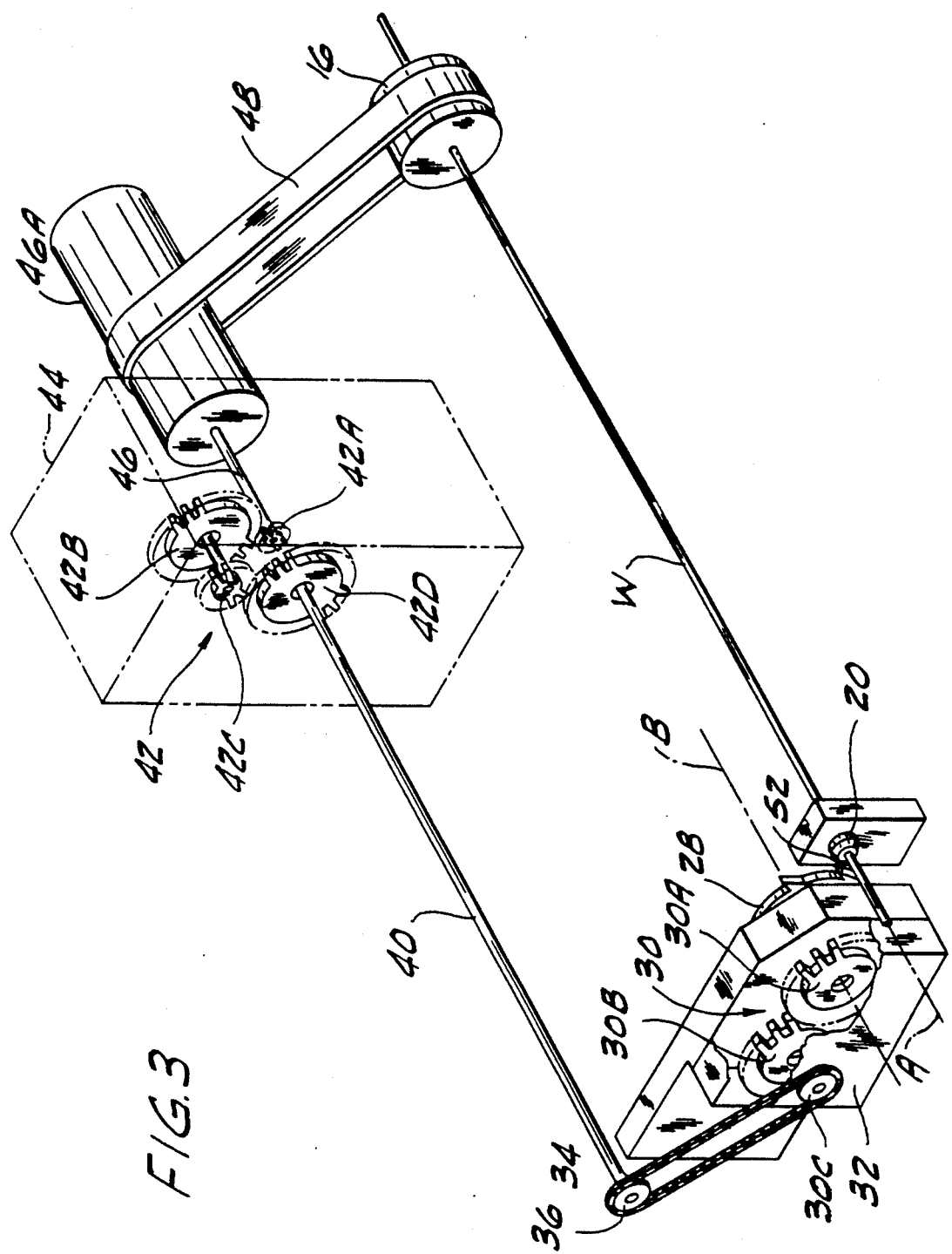

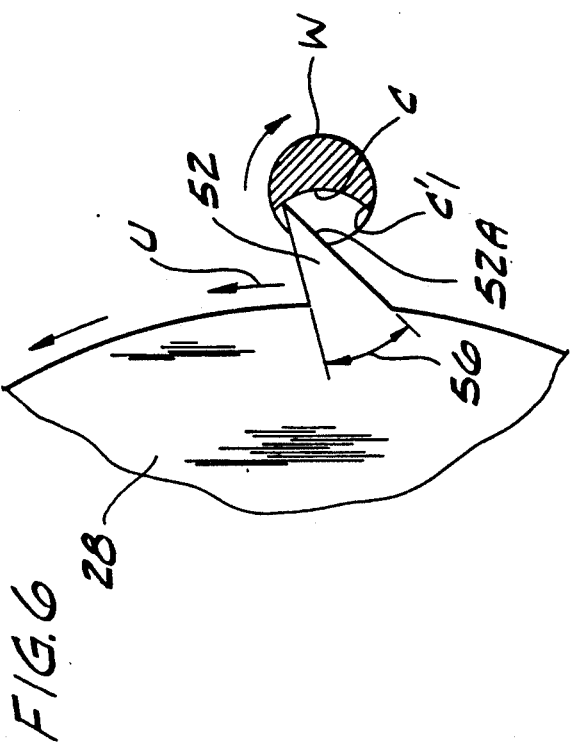
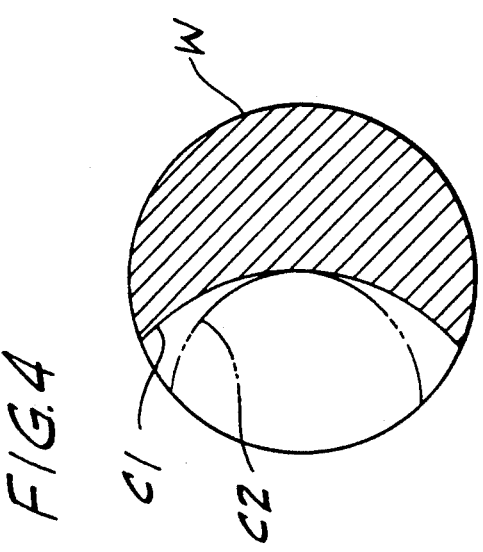
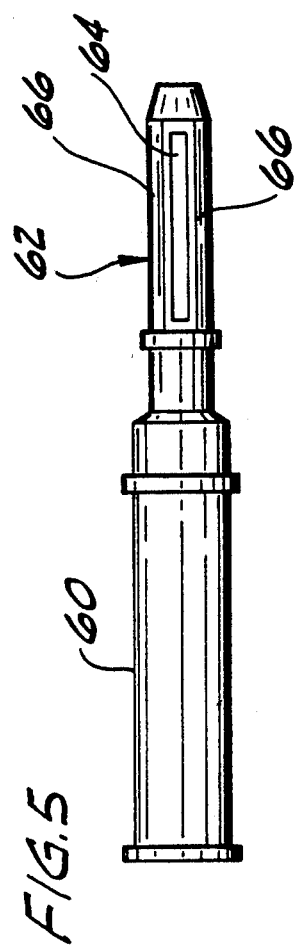

METHOD AND APPARATUS FOR TURNING A CONCAVE CUT IN A WORKPIECE

This is a division of application Ser. No. 07/961,484, filed Oct. 15, 1992, now U.S. Pat. No. 5,255,580.

BRIEF SUMMARY OF THE INVENTION

This invention relates generally to workpiece turning on a lathe or screw machine, and more particularly to forming a concave cut in a long, slender workpiece on a screw machine.

Forming parts from long, thin cylindrical bar stock using a specialized lathe or screw machine is well known. Screw machines have been used for years to form miniature parts for watches and other small devices. Generally, the screw machine supports and rotates the bar stock about its longitudinal axis. The bar stock extends through a collet which is operable to reciprocate for gradually advancing the workpiece forward through the bushing while permitting rotation of the bar stock about its longitudinal axis. The screw machine includes a bushing which supports the bar stock adjacent to a tool which is positioned for cutting into the bar stock. The bushing prevents bending of the slender bar stock when it is engaged by the tool.

It is also well known that to form the workpiece with a polygonal cross section, a rotary cutter, in place of a fixed tool, is used in combination with the screw machine. An example of such a "polygon" attachment is shown in Dahlgren et al., U.S. Pat. No. 469,813. The rotary cutter has a blade with one or more teeth on it, and is rotated in the same direction as the bar stock. The relative rotation of the bar stock and blade are such that the cuts formed are relatively flat, which is necessary for forming a small nut or similar part. The ratio of the angular velocity of the bar stock to the angular velocity of the blade is a ratio of whole numbers with the speed of the blade being equal to or greater than the speed of the bar stock.

At higher speeds of the blade relative to the bar stock in U.S. Pat. No. 469,813, the surfaces cut in the bar stock are slightly concave. In the situation where the blade rotates much faster that the bar stock, it is almost as though the bar stock were stationary. Thus, the cut begins to take on the shape of the periphery of the blade. The lower limit of the radius of curvature of the cut formed by the method and apparatus of U.S. Pat. No. 469,813 is equal to the radius of the blade.

There is presently a need for forming bar stock with thin, relatively deep cuts having a small radius of curvature on a screw machine. For example, compliant pin electrical connectors must be formed with flexible portions adapted to be plugged into openings in a circuit board. The flexible portions typically comprise an elongate hole extending transversely through the pin and bounded by legs of the connector which are joined at both ends of the hole. To form such a flexible portion by turning, deep, thin cuts in the bar stock are needed. The outer diameter of the pin at the flexible portion is greater than the opening in the circuit board in which it is received so that the legs are deformed inwardly. The connector material is such that the legs are at least somewhat elastic so that they exert a radially outwardly directed force against the sides of the opening to hold the connector in the opening.

Presently, compliant pin connectors as described are formed either by stamping from sheet metal and rolling into the final generally cylindrical shape, or by cold heading. The tooling necessary to form by stamping or cold heading requires a substantial capital investment as compared to the cost of screw machine tooling. In addition, it is believed that compliant pin connectors formed on a screw machine have more desirable electrical characteristics (i.e., they carry more current), and mechanical characteristics (i.e., they will withstand a greater number of cycles of being plugged in without failure).

Among the several objects and features of the present invention may be noted the provision of a method for machining concave cuts in a slender, generally cylindrical workpiece which is capable of producing thin, deep cuts in the workpiece; the provision of such a method in which the radius of curvature of the cut may be accurately selected; the provision of such a method useful for forming compliant pin electrical connectors and requiring a relatively small capital investment.

Further among the several objects and features of the present invention may be noted the provision of workpiece turning apparatus for carrying out the method of the present invention; the provision of such apparatus which is readily reconfigured for cutting workpieces of different diameters; the provision of such apparatus which synchronizes a rotary cutting tool with the workpiece; and the provision of apparatus which is relatively inexpensive.

Generally, a method of the present invention for turning a concave cut in a workpiece on a screw machine comprises the steps of supporting the workpiece for rotation generally about its longitudinal axis. The workpiece is rotated about an axis generally corresponding to its longitudinal axis in a first direction. A rotary cutter having a tooth is turned about an axis parallel to the axis of rotation of the workpiece in a second direction opposite to the first so that the cutter tooth engages the workpiece for forming a generally concave cut in the workpiece.

Apparatus constructed according to the principles of the present invention comprises lathe means for supporting the workpiece which is capable of rotating the workpiece about an axis generally corresponding to its longitudinal axis. Rotary cutter means comprises a rotary saw blade mounted for rotation generally adjacent the workpiece. The saw blade is capable of rotation about an axis parallel to the axis of rotation of the workpiece in a direction opposite to the direction of rotation of the workpiece, and has a first tooth thereon adapted to engage the workpiece for forming a first cut in the workpiece. Synchronization means interconnects said lathe means and said cutter means such that the ratio of the angular velocity of the workpiece to the angular velocity of the saw blade is a ratio of whole numbers with the angular velocity of the saw blade equal to or less than the angular velocity of the workpiece.

Other objects and features of the present invention will be in part apparent and in part pointed out hereinafter.

BRIEF DESCRIPTION OF THE DRAWINGS

FIG. 1 is a schematic front elevation of apparatus of the present invention;

FIG. 2 is a left side elevation thereof;

FIG. 3 is a schematic perspective of the apparatus with portions removed to illustrate a synchronizing mechanism of the apparatus;

FIG. 4 is a cross section of a workpiece schematically illustrating cuts of different curvature;

FIG. 5 is a greatly enlarged elevation of a compliant pin connector formed with the apparatus;

FIG. 6 is an enlarged, fragmentary elevation of a saw blade of the apparatus and workpiece being machined thereby;

Corresponding reference characters indicate corresponding parts throughout the several views of the drawings.

DETAILED DESCRIPTION OF THE PREFERRED EMBODIMENT

Figure 7:
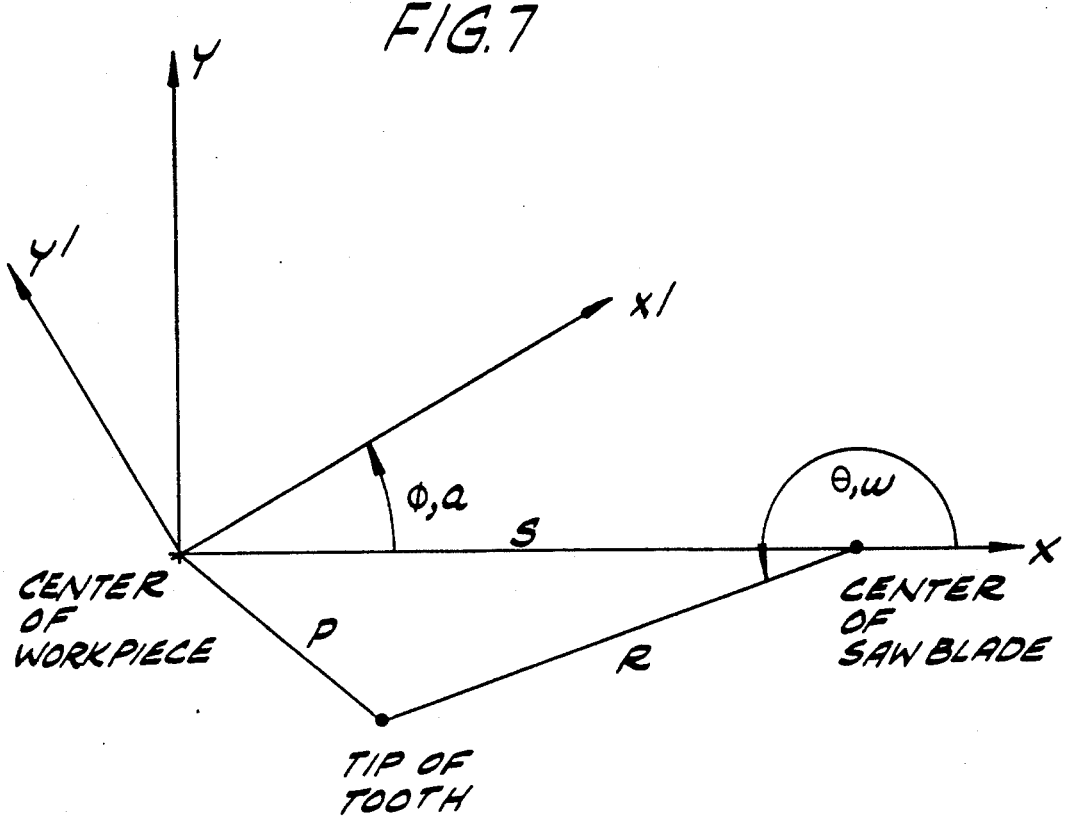
FIG. 7 is a plot illustrating the derivation of a formula describing the cross-sectional shape of a cut in the workpiece.

Referring now to the drawings, a workpiece turning apparatus, indicated generally at 10, for forming a concave cut in a long, slender workpiece W is shown to comprise a screw machine 12 (broadly "lathe means") supporting the workpiece for rotation about an axis of rotation A generally corresponding to the longitudinal axis of the workpiece. The screw machine 12 schematically illustrated herein is Model No. AR-10 manufactured by Andre Bechler S.A. of Moutier, Switzerland. The screw machine 12 includes an electric motor (not shown) operatively connected to a drive spindle 16 through which the workpiece W is received. The motor is operable to turn the workpiece W about the axis of rotation A in the conventional fashion. The workpiece W extends through the screw machine 12 and through a collet 18 at the forward end of the screw machine. The collet 18 is capable of reciprocating to advance the workpiece W longitudinally as is it being rotated about the axis of rotation A in a way which is also well known in the art. It is to be understood that other types of screw machines, including those which do not have a reciprocating collet, may be used and still fall within the scope of this invention.

The workpiece extends forward of the collet 18 through a bushing 20 mounted in a support 22. The bushing 20 supports the workpiece W for rotation adjacent to the area where machining of the workpiece will occur. Ordinarily, the screw machine 12 would have a stationary tool (not shown) forward of the bushing 20 which would be selectively movable into engagement with the workpiece for machining the workpiece W. However in place of a stationary tool, the apparatus 10 of the present invention has a rotary cutter, indicated generally at 26, comprising a generally circular rotary saw blade 28 mounted on rotation-reversing gearing, indicated generally at 30 (FIG. 3) and located in a first gear box 32. The saw blade 28 is disposed generally adjacent to the workpiece W for rotation about an axis B parallel to the axis of rotation A of the workpiece.

The saw blade 28 is mounted for conjoint rotation with a first internal gear 30A of the rotation-reversing gearing 30 which is enmeshed with a second internal gear 30B in the first gear box 32 (FIG. 3). A first sprocket gear 30C, which is mounted for rotation with the second internal gear 30B on the outside of the first gear box 32, is connected by a chain 34 to a second sprocket gear 36 for conjoint rotation with the second sprocket gear. The second sprocket gear 36 is fixed on an output shaft 40 extending rearwardly from the rotary cutter 26 and attached to reduction gearing, indicated generally at 42, in a second gear box 44 near the rear of the screw machine 12. An input shaft 46 extending rearwardly from the second gear box 44 has an enlarged splined pulley 46A thereon which is connected by a toothed belt 48 to the drive spindle 16. The teeth on the inside of the belt 48 are engaged in the splines of the drive spindle 16 and the pulley 46A, and the pulley has the same diameter as the drive spindle, so that the pulley (and hence the input shaft 46) rotates conjointly in a 1:1 ratio with the drive spindle. In this way, the screw machine 12 and rotary cutter 26 are interconnected and synchronized so that the ratio of angular velocities of the workpiece W and saw blade 28 is a ratio of whole numbers. The toothed belt 48, splined pulley 46A, input shaft 46, reduction gearing 42, output shaft 40, second sprocket gear 36 and rotation-reversing gearing 30, constitute "synchronization means" in the preferred embodiment. However, it is to be understood that other structures to achieve opposite rotation of the saw blade 28 and workpiece W, and a precise ratio of whole numbers of their relative angular velocities may be used and still fall within the scope of the present invention.

The reduction gearing 42 reduces the angular velocity from the input shaft 46 to the output shaft 40 by a ratio of whole numbers. As schematically shown in FIG. 3, the reduction gearing 42 in the second gear box 44 has four gears, designated 42A–42D, which have been selected to reduce the angular velocity of the output shaft 40 relative to that of the input shaft 46 (and drive spindle 16) by a ratio of 1:12. The screw machine 12 has been removed in FIG. 3, except for its drive spindle 16 and bushing 20 for clarity in illustrating the synchronizing mechanism. The rotation of the output shaft 40 is in the same direction as the input shaft 46 and drive spindle 16. Different reduction ratios may be achieved by replacing the gears 42A–42D in the second gear box 44 with gears having different relative diameters. Applicant envisions use of a gear box in which the reduction ratio could be changed without manually replacing the gears 42A–42D. The second sprocket gear 36 on the forward end of the output shaft 40 is the same size as the first sprocket gear 30C on the first gear box 32 so that the angular velocity transferred to the second internal gear 30B of the rotation-reversing gearing 30 is the same as the output shaft. The first internal gear 30A has the same diameter as the second internal gear 30B so that its angular velocity is also the same as that of the output shaft 40. However, the first internal gear 30A rotates in a direction opposite the direction of rotation of the output shaft 40. Therefore, the saw blade 28 rotates with the same angular velocity as the output shaft 40, but in a direction opposite the drive spindle 16 and workpiece W.

In the illustrated embodiment, the saw blade 28 has two teeth, designated 52 and 54, respectively (FIG. 3). The gears 42A–42D in the second gear box 44 have been selected so that the ratio of the rate of rotation of the workpiece W to that of the saw blade is 12:1. In order to form two cuts on the workpiece W having centers spaced 180° from one another, when the angular velocity ratio of the workpiece to the saw blade is 12:1, the teeth 52, 54 have been separated by 45°. In the time the saw blade 28 rotates from a position where the first tooth 52 first engages the workpiece W to the time the second tooth 54 engages the workpiece, the workpiece will have rotated 1.5 times so that the opposite side of the workpiece is cut by the second tooth. Of course, more than two teeth could be used on the saw blade 28 so long as the teeth are separated by 15° or some odd numbered multiple thereof. The specific angular separation of the teeth needed to make cuts separated by 180° is dictated by the ratio of the angular velocity of the workpiece W to that of the saw blade 28. It is to be understood that cuts at different angular separations on the workpiece W could be made by choosing a saw blade having saw teeth at different angular separations from each other or by changing the ratio of the angular velocity of the workpiece W to that of the saw blade 28.

The width of each tooth 52, 54 must be selected so that the tooth (e.g. first tooth 52) will clear a cut C it makes in the workpiece before the workpiece W engages the back side 52A of the tooth, which would damage the workpiece. As indicated by arrow U in FIG. 6, the tooth 52 and the workpiece W are both moving generally upwardly at their point of engagement. However, because the workpiece W is rotating much faster than the tooth, the portion C' of the cut formed initially by the tooth 52 tends to "catch-up" with the tooth. Clearance of the back side 52A of the tooth from the cut C becomes a greater concern as the angular velocity of the workpiece W increases relative to that of the saw blade 28. For example, it has been found that for a saw blade 28 having a diameter of approximately 1 inch, a tooth 52 having a relief angle 56 (see FIG. 6) of approximately 40° is sufficiently thin to clear a cut C of a depth of approximately 0.0335 inches in a workpiece having a diameter of 0.065 inches, where the ratio of angular velocities of the workpiece and saw blade is 12:1.

The first gear box 32 and saw blade 28 are mounted by a linkage (not shown) for pivoting movement toward and away from the workpiece W to bring the saw blade into and out of engagement with the workpiece and to control the depth of the cut C. The pivoting motion is controlled by a cam shaft (not shown) driven by the screw machine 12 at a predetermined rate. For each finished part (e.g., compliant connector pin 60 shown in FIG. 5) the apparatus 10 produces, there is one rotation of the cam shaft. The cam shaft is a part of the screw machine 12 purchased from the manufacturer. The linkage for pivoting the saw blade 28 is readily understood by those with skill in the art as being of the type to control lateral motion of stationary tools. To allow for such motion, the chain 34 connecting the first and second sprocket gears 30C, 36 would be longer than shown, and would mesh with a spring-biased idler gear (not shown) to take up slack. The excess length of the chain 36 would permit movement between the sprocket gears 30C and 36. In order to form cuts of different depths or to adjust to workpieces of difference diameter, a cam (not shown) on the cam shaft can be quickly and easily changed. The shape of the cut can also be easily changed by changing the gearing 42A-42D in the second gear box 44.

Having generally described the structure of the apparatus 10 of the present invention, its operation is now described. For purposes of example, the operation will be for the machining of a compliant portion, indicated generally at 62, of the compliant pin electrical connector 60 made from high tensile strength phosphor bronze bar stock (i.e., workpiece W). However, the connector 60 may be made of other materials of sufficient strength and of suitable electrical conductivity, such as leaded nickel copper or beryllium copper. The workpiece W is threaded through the drive spindle 16, collet 18 and support bushing 20 and fixed for rotation with the drive spindle in a first direction generally about the longitudinal axis of the workpiece.

Upon activation of the electric motor (not shown) the saw blade 28 is simultaneously rotated about the axis B parallel to the axis of rotation A of the workpiece, but in a second direction opposite to the first. Prior to activating the electric motor, the reduction gearing 42 is selected so that the ratio at which the workpiece turns relative to the cutter blade 28 is, for example, 12:1. In order to form an opening 64 completely through the workpiece without cutting it in two, the saw blade 28 must make deep concave cuts at two points separated by 180°. Thus, the saw blade 28 is provided with two (or more) teeth 52, 54 set apart by 45° on the periphery of the saw blade. The depth of the cut is set so that it is slightly more than one half the diameter of the workpiece. As may be seen by reference to FIG. 4, the width of a cut C1 made by one of the teeth 52, 54 at a 6:1 ratio will be somewhat wider, and its radius of curvature larger than a cut C2 (shown in phantom) made at a ratio of 12:1. The saw blade 28 is brought into engagement with the bar stock by rotation of the cam shaft (not shown) of the screw machine 12 and formation of the opening 64 begins. The collet 18 automatically advances the bar stock forwardly an appropriate distance so that a opening 64 of sufficient length is formed.

The cross-sectional shape of the cut in the bar stock formed by one tooth 52 on the saw blade 28, with respect to a coordinate system (x1, y1) rotating with the workpiece W, is described by the following equations:

$$x1 = S\cos\phi - R\cos\{\phi[(\omega/\alpha) - 1)]\} \quad (1)$$

$$y1 = -\{S\sin\phi - R\sin\{\phi[(\omega/\alpha) - 1)]\}\} \quad (2)$$

Equations (1) and (2) describe the shape of the cut in terms of the angular position of the reference coordinate system (x1,y1). However, by defining the initial conditions and substituting for the angular position $\phi$ of the reference coordinate system, the equations may be stated in terms of the angular position $\theta$ of the saw blade.

$$x1 = S\cos[(\alpha/\omega)(\theta - \pi)] - R\cos[(\theta - \pi)(1 - \alpha/\omega)] \quad (3)$$

$$y1 = -\{S\sin[(\alpha/\omega)(\theta - \pi)] + R\sin[(\theta - \pi)(1 - \alpha/\omega)]\} \quad (4)$$

FIG. 7 illustrates the derivation of equations (1)–(4) using the following nomenclature:

(x,y) = global coordinate system;
(x1, y1) = a reference coordinate system rotating at the angular velocity $\alpha$ with the workpiece;
R = radius of the saw blade;
r = radius of the workpiece;
S = distance between the center of the workpiece and the center of the saw blade; P1 $\theta$ = angular position of the saw blade tooth tip;
$\phi$ = angular position of the reference coordinate system;
$\omega$ = angular velocity of the saw blade;
$\alpha$ = angular velocity of the reference coordinate system; and
P = vector defining the position of the saw blade tooth tip.

Generally, equations (1)–(4) were derived by defining the vector P in terms of the global coordinate system (x,y) and transferring the equations into terms of the rotating reference coordinate system (x1,y1). The initial conditions were selected so that at a time t=0, the angular position of the reference coordinate system equals 0, and the angular position $\theta$ of the saw blade tooth tip is $\pi$.

To describe the shape of the cut formed in the workpiece, equations (1)–(4) are applied during the interval in which the saw blade engages the workpiece. The following equations describe that interval in terms of the angular position $\theta$ of the saw blade 28, and the angular position $\phi$ of the reference coordinate system (x1,y1), respectively.

$$\theta \geq \pi + \cos^{-1}[(R^2+S^2-r^2)/(2RS)], \text{ and}$$
$$\theta \leq \pi - \cos^{-1}[(R^2+S^2-r^2)/(2RS)] \quad (5)$$

$$\phi \geq -(\alpha/\omega)\cos^{-1}[(R^2+S^2-r^2)/(2RS)], \text{ and}$$
$$\phi \leq (\alpha/\omega)\cos^{-1}[(R^2+S^2-r^2)/(2RS)]. \quad (6)$$

Figure 8:
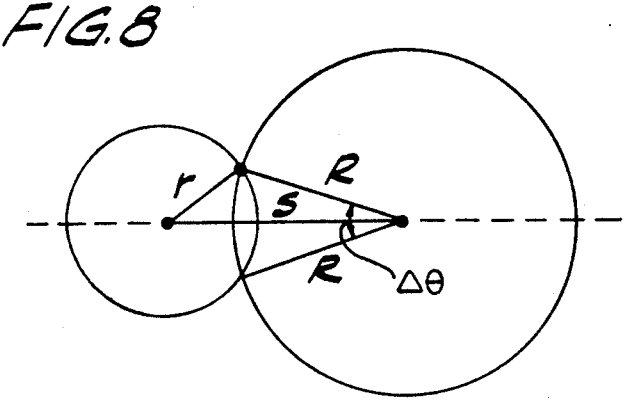
FIG. 8 is a plot illustrating the derivation of the interval over which the cut shape formula are applied.

Derivation of the interval equations (5) and (6) may be understood by reference to FIG. 8. The circle on the left represents the outer circumference of the workpiece W, and the circle on the right represents the path of the tip of one of the saw blade teeth (e.g., tooth 52). Using the Law of Cosines, the radius r of the workpiece was solved in terms of the radius R of the saw blade 28, the distance S between centers of the workpiece and saw blade, and the angle $\Delta\theta$ through which the saw blade turns when the tooth is engaged with the workpiece.

The inventor wishes to recognize the assistance of Mr. Wiley P. Buchanan and Mr. Ronald A. Rinke in the derivation and computer model testing of equations (1)–(6).

The compliant pin connector 60 shown in FIG. 4 has the compliant portion 62 formed as described above. The remainder of the connector 60 is machined in a way which is well known in the field of contact formation on screw machines. Legs 66 of the connector 60 on either side of the opening 64 are deformable upon insertion into an opening in a circuit board (not shown), and sufficiently resilient once inserted in the opening to exert a radially outward force against the circuit board to hold the connector in the board without soldering or other connection. It is believed that compliant pin connectors formed from a solid piece of material are stronger than those formed by stamping or cold heading, and carry more current.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A compliant pin connector made according to a method for turning a concave cut in a workpiece on a screw machine comprising the steps of:
   supporting the workpiece for rotation generally about its longitudinal axis;
   rotating the workpiece in a first direction about an axis generally corresponding to its longitudinal axis;
   turning a rotary cutter having a tooth about an axis parallel to the axis of rotation of the workpiece in a second direction opposite to the first, the cutter tooth engaging the rotating workpiece for forming a generally concave cut in the workpiece, wherein the ratio of the angular velocity of the workpiece to the angular velocity of the cutter is a ratio of whole numbers with the angular velocity of the cutter being equal to or less than the angular velocity of the workpiece;
   reducing the width of the cut in the workpiece by increasing the angular velocity of the workpiece relative to the cutter;
   providing a second tooth on the cutter disposed relative to the first tooth for forming a second cut in the workpiece spaced from the first cut a predetermined angular distance, wherein the second tooth is disposed for forming a cut in the workpiece having a center located 180° from the center of the cut formed by the first tooth, the method further comprising the steps of selecting the workpiece material from a group including electrically conductive materials suitable for use as solderless, press-in electrical pin connectors and forming the cuts to a sufficient depth whereby the cuts intersect to create an opening through the workpiece, portions of the workpiece on laterally opposite sides of the cut being adapted to be deformed inwardly toward the cut.

2. A compliant pin connector made according to a method for turning a concave cut in a workpiece on a screw machine comprising the steps of:
   selecting the workpiece material from a group including electrically conductive materials suitable for use as solderless, press-in electrical pin connectors;
   supporting the workpiece for rotation generally about its longitudinal axis;
   rotating the workpiece in a first direction about an axis generally corresponding to its longitudinal axis;
   turning a rotary cutter having a first tooth about an axis parallel to the axis of rotation of the workpiece in a second direction opposite to the first, the cutter tooth engaging the workpiece for forming a generally concave cut in the workpiece;
   providing a second tooth on the cutter disposed relative to the first tooth for forming a second cut in the workpiece spaced for the first cut a predetermined angular distance;
   forming the cuts to a sufficient depth whereby the cuts intersect to create an opening through the workpiece, portions of the workpiece on laterally opposite sides of the cut being adapted to be deformed inwardly toward the cut.

3. A compliant pin connector made according to the method as set forth in claim 2 wherein the ratio of the angular velocity of the workpiece to the angular velocity of the cutter is a ratio of whole numbers with the angular velocity of the cutter being equal to or less than the angular velocity of the workpiece.

4. A compliant pin connector made according to the method as set forth in claim 3 further comprising the step of reducing the width of the cut in the workpiece by increasing the angular velocity of the workpiece relative to the cutter.

5. A compliant pin connector made according to the method as set forth in claim 4 wherein the second tooth is disposed for forming a cut in the workpiece having a center located 180° from the center of the cut formed by the first tooth.

6. A compliant pin connector made according to the method as set forth in claim 5 further comprising the step of selectively advancing the workpiece longitudinally thereby to form a cut of a predetermined length in the workpiece.

7. A compliant pin connector made according to the method as set forth in claim 2 wherein the ratio of the angular velocity of the workpiece to the angular velocity of the cutter is a ratio of whole numbers and is set so that the radius of curvature of the cut formed is less than the radius of the saw blade.

* * * * *